United States Patent

[11] 3,570,538

| [72] | Inventor | Paul Saffin Von Corpon<br>4 rue de l'Athenee, Geneva, Switzerland |
|---|---|---|
| [21] | Appl. No. | 818,618 |
| [22] | Filed | Apr. 23, 1969 |
| [45] | Patented | Mar. 16, 1971 |
| [32] | Priority | Apr. 30, 1968 |
| [33] | | Switzerland |
| [31] | | 6435/68 |

[54] MIXING TAP FOR WATER
3 Claims, 7 Drawing Figs.

[52] U.S. Cl. .................................................. 137/625.4
[51] Int. Cl. .................................................. F16k 11/02
[50] Field of Search .................................... 137/625.4

[56] References Cited
UNITED STATES PATENTS

| 2,020,286 | 11/1935 | Bittle | 137/625.4UX |
| 2,185,889 | 1/1940 | Downey | 137/625.4 |
| 3,126,914 | 3/1964 | Dombre | 137/625.4 |
| 3,435,849 | 4/1969 | Von Corpon | 137/625.4 |

*Primary Examiner*—M. Cary Nelson
*Assistant Examiner*—Michael O. Sturm
*Attorney*—Waters, Roditi, Schwartz & Nissen ABSTRACT: The socket of a ball-and-socket joint is rigidly connected within the tap body to the operating handle, and the ball of the joint nests in a recess in the socket and incorporates four spherical-headed valves arranged symmetrically about the center of the ball, which ball is turned about a center different from its own center.

Patented March 16, 1971 3,570,538

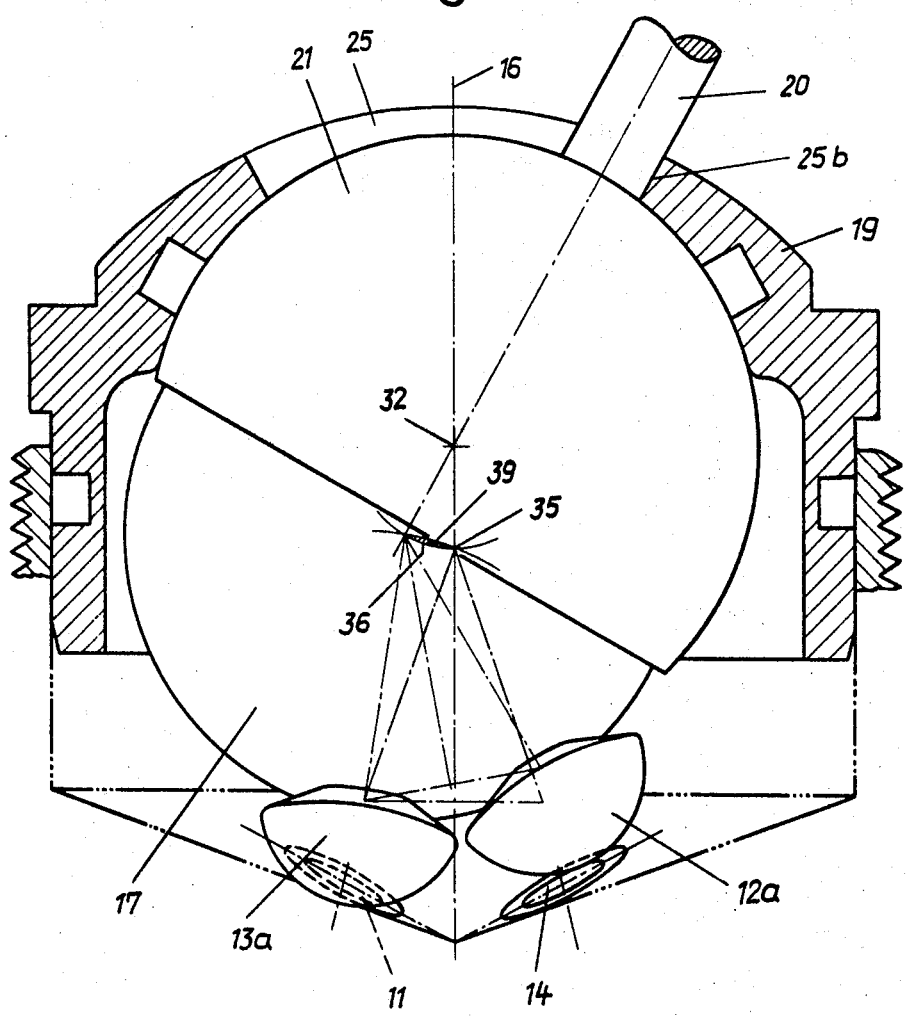

MIXING TAP FOR WATER

BACKGROUND OF THE INVENTION

The present invention relates to mechanical mixing taps.

The main problem encountered in the mixing of hot and cold water is to control the feeds and the delivery of the mixed water without using any springs and independently of the pressure in the water supply pipes.

One existing type of tap has a component fitted with hemispherical valves that control the water feed and delivery passages, this component being arranged to rock, under the control of a pin fixed to a handle articulated within the body of the tap, and to operate in conjunction with a chamber provided within the said component. The principal drawback of this design lies in the fact that the component bearing the valves is in almost tangential contact with the end of the pin connected to the handle. Consequently, the component is not always positioned with the sufficient precision, especially laterally, and its operation is not always as it should be.

SUMMARY OF THE INVENTION

An object of the present invention is to provide a mechanical mixing tap with an operating handle articulated by a ball-and-socket joint in the body of the tap which overcomes the above-mentioned drawback.

This object and others of the invention will be apparent from the following detailed description of one embodiment and a variant of the invention.

BRIEF DESCRIPTION OF THE DRAWINGS

The invention will be described, by way of example, with reference to the accompanying drawings which illustrate one form of tap embodying the principle of the present invention, and a variant thereof. In the drawings:

FIGS. 5 and 6 are enlarged details of the ball-and-socket joint including explanatory diagrams.

DESCRIPTION OF THE PREFERRED EMBODIMENT AND ITS VARIANT

Figure 1:
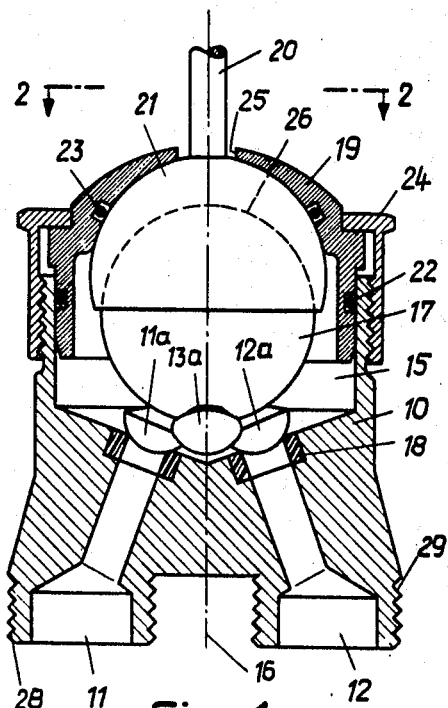
FIG. 1 shows a part axial section of a tap in a closed position.
Figure 2:
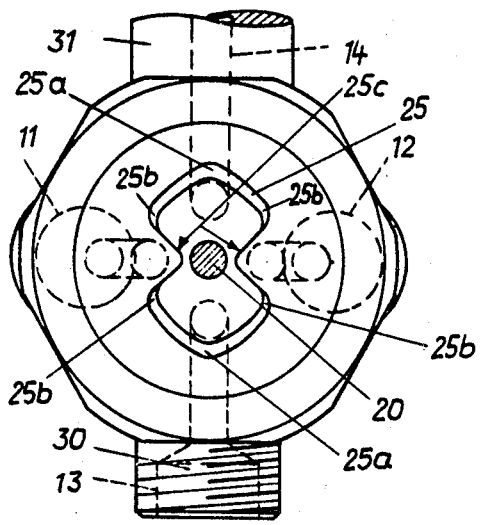
FIG. 2 is a plan view, partly in section, taken along the line 2–2 in FIG. 1.
Figure 3:
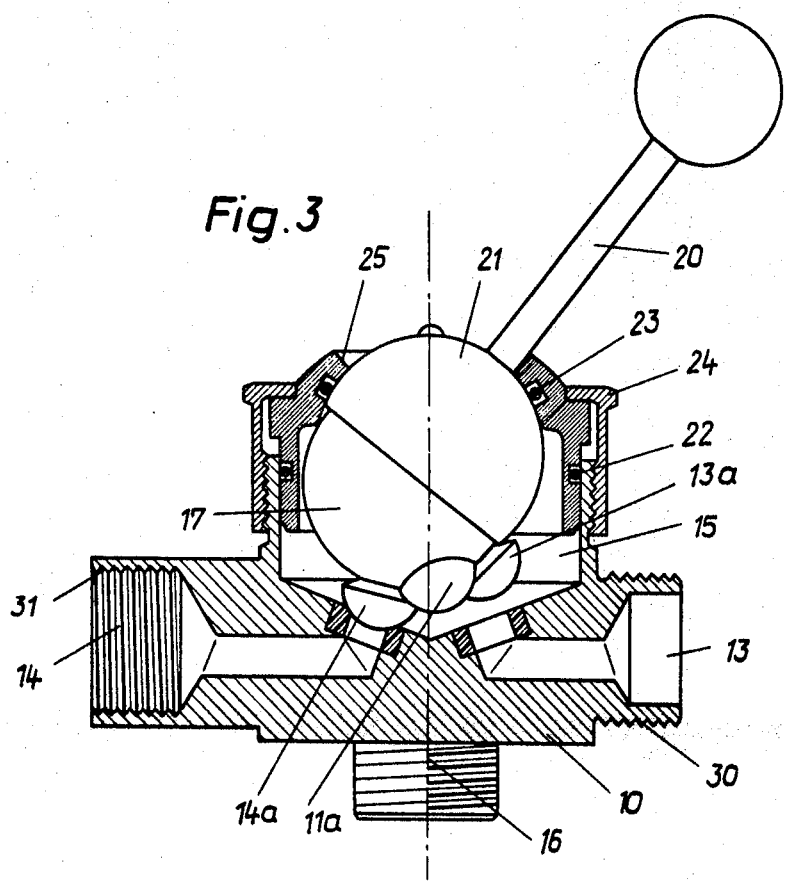
FIG. 3 is an axial section taken along the line 3–3 in FIG. 1, but with the tap in the open position.

Referring now to the drawings in detail the mechanical mixing tap shown in FIGS. 1 to 4 comprises a body 10, containing four water passages 11, 12, 13 and 14, serving respectively as hot-water feed and cold-water feed (see FIG. 1) and as mixture deliveries to the bath and shower (see FIG. 3). These four passages open into a mixing chamber 15 through four seatings arranged symmetrically about a center line 16 of the tap.

For selective control of the flow of water past these seatings, the chamber 15 contains a ball 17, to which are fixed four spherical-headed valves 11a, 12a, 13a and 14a, arranged symmetrically in relation to the center of the ball and working respectively in conjunction with the four resilient seatings, which consist of compressible packings 18, fitted into housings surrounding those ends of the passages 11, 12, 13 and 14 which open into the chamber 15.

The chamber 15 is closed by a cap 19, fixed to the body 10 by a nut 24. The operation of the tap is controlled by a handle 20 carrying socket 21 which receives ball 17 to form a ball-joint connection. Packings 22 and 23, fitted respectively between the cap 19 and the body 10 and between the cap 19 and the socket 21 of the joint, provide a seal between those members. The socket 21 lies within the chamber 15, the handle 20 passing through a central opening 25 in the cap 19. The socket 21 of the joint has a spherical recess 26, of the same radius as the ball 17 nested therein, the recess being off center with respect to the outer face of the socket 21.

The hot and cold water supply pipes are screwed on to threaded portions 28 and 29 respectively, of the body 10. The pipes running from the tap to the bath and the shower are connected respectively to the parts 30 and 31 of the body 10 (see FIGS. 2 to 4).

Figure 4:
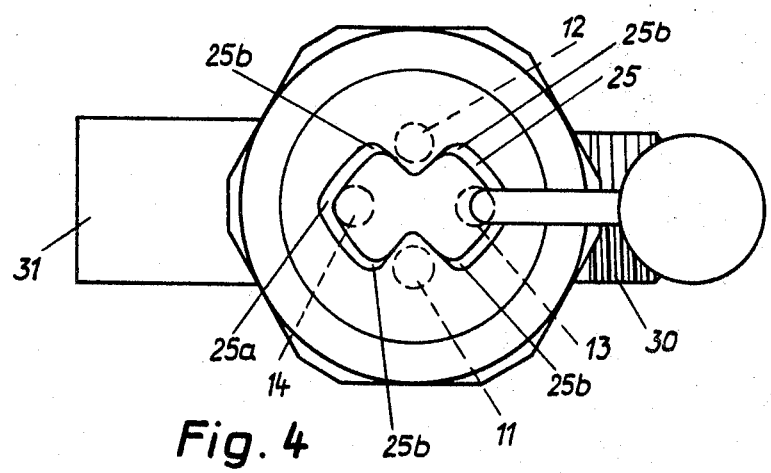
FIG. 4 is a plan view of the tap illustrated in FIG. 3.

The edge of the opening 25 in the cap 19 forms a curve incorporating two symmetrical portions, which, in this example, are each substantially in the form of a square having one corner which is open and is joined to the sides of the square formed by the other symmetrical portion (see FIGS. 2 and 4). The shape of this opening 25 will be described more fully later.

Figure 5:
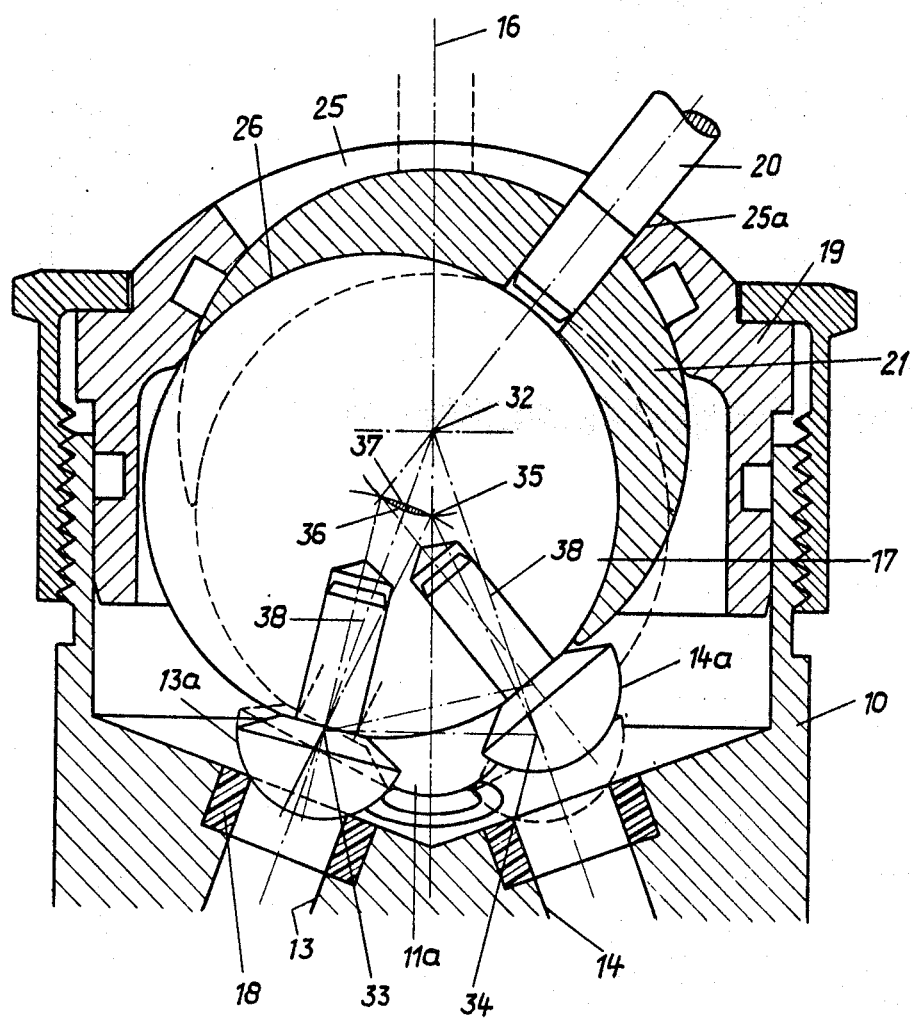

The geometry and the mode of operation of the mechanical mixing tap will now be described with reference to FIGS. 5 and 6.

The center of the socket 21 of the joint is numbered 32, the center of the spherical valve 13a is at 33, the center of the spherical valve 14a is at 34 and the center of the ball 17 and recess 26 when the valves are closed is at 35. Any movement of the handle 20 about the center 32 will result in the center 35 of the ball 17 being moved along a spherical surface whose radius is equal to the distance between the centers 32 and 35, the ball 17 bearing against one valve or against two valves simultaneously. Reference to FIG. 5, in which the ball bears against the valve 13a, shows that the center 35 of the ball 17 can describe a spherical surface 36 about the center 32 of the socket 21. Theoretically, that center can describe a second spherical surface, 37, about the center 33 of the valve 13a. The intersection of the surfaces 36 and 37 defines the limit of movement of the handle 20 and hence enables the shape of the opening 25 in the cap 19 to be defined, the edges of the opening 25 constituting a stop by which the movement of the handle 20 is limited. The point in the rocking action shown in FIG. 5 corresponds to the portion 25a of the opening. Actually, the center 35 of the ball 17 moves over the surface 36 and coincides with the surface 37 only at its intersection with the surface 36. The shaded portion corresponds to the compression of the resilient seating formed by the compressible packing 18. The reason why it is necessary to limit the movement of the handle 20 at the intersection of the surfaces 36 and 37 is that the valve 13a would otherwise be lifted off its seating 18 by the pressure of the water contained in the chamber 15 and the water would be able to escape through both the bath and the shower outlets.

It should also be observed that each seating 11, 12, 13 and 14 lies in a plane at right angles to the line 38 joining the center 32 of the socket 21 to the center of each of the valves in the closed position and that each of the water passages is coaxial with the line 38 passing through its respective valve.

The diagram in FIG. 6 represents the rocking of the ball 17 on two valves, a delivery valve 13a or 14a and a feed valve 11a or 12a. The spherical surface 36 is intersected by a circle, 39, described by rotation of the center 35, situated at the apex of an isosceles triangle, the base of which is a line joining the centers of the two spherical valves on which the ball 17 rocks, about the base of that isosceles triangle. The intersection of the circle 39 with the sphere 36 defines the limit of angular displacement of the handle 20 about the center 32 of the socket of the joint. This limit is formed by one of the portions 25b of the opening 25. Two reentrant portions, 25c, of the opening 25 compel the handle to pass through the position in which all the seatings are closed between the shower and the bath outlet members.

The mode of operation of the tap will now be described with particular reference to FIG. 2.

By rocking the handle 20 in the lower portion of the opening 25, the flow from the bath outlet 13 is controlled. When the handle bears against the face 25a in the lower portion of the opening 25, the ball occupies the position shown in FIG. 5, the seating associated with the passage 14 being closed and the seatings for the passages 11 and 12 being equally opened, so that an equal mixture of hot and cold water will flow from the passage 13. Then, by rocking the handle 20 to the right, from the portion 25a towards the portion 25b, the flow of hot water admitted through the passage 11 is gradually reduced while the flow of cold water through the passage 12 is gradually increased, until the hot water is completely cutoff, the handle 20 then being at 25b, in the position shown in FIG. 6. If the handle 20 is then gradually moved radially to the center, the passages 11 and 13 will be gradually closed. By moving the handle in the upper portion of the opening 25, the flow from the shower outlet 14 is controlled, regulation of the feeds 11 and 12 being obtained as described with reference to the bath outlet.

Figure 7:
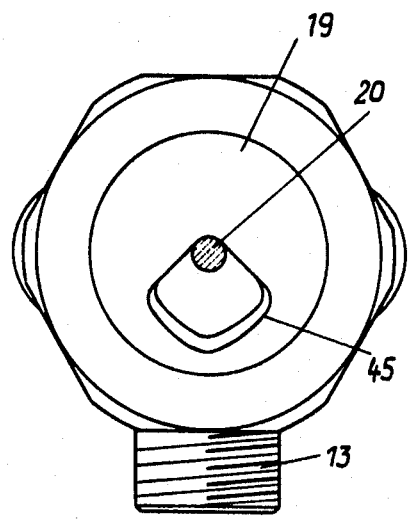
FIG. 7 is a plan view of a variant of the tap according to the invention.

FIG. 7 shows a variant of the opening 45 in the cap 19, this being intended for a tap designed to provide only one water delivery outlet 13. In this case, the ball 17 will still be equipped with four valves 11a, 12a, 13a and 14a, but the seating of the valve 14a will be blocked off, though still fitted with a resilient packing 18, to allow the handle 20 to be moved in the compression zones, between the spherical surface 36 and the spherical surface 37 and circle 39 respectively, shown shaded in FIGS. 5 and 6.

It will be noted that the nut 24 enables play to be taken up when necessary.

Although the preferred embodiment and a variant thereof have been described, the scope of, and the breadth of protection afforded to, the invention are limited solely by the appended claims.

I claim:

1. A mechanical-mixing tap comprising a hollow housing having at least three ducts each with an elastic seat, a ball and socket joint in said housing including a pivotal socket in said housing and a ball rotatably engaged within said socket, handle means attached to said socket for pivoting the socket in the housing and for moving the ball engaged with the socket, said ball having a center which is offset from the pivotal axis of the socket within the housing, four spherical valves on said ball disposed symmetrically with respect to the center thereof, two of said valves constituting a first set cooperating with two resilient seats of inlet ducts for hot and cold water respectively, the other two valves constituting a second set cooperating with respective elastic seats at least one of which is a seat for a water outlet duct, and means for limiting pivotal displacement of said socket to maintain at least one of the valves of the second set in closed position against its seat.

2. A tap as claimed in claim 1 wherein said housing has a mixing chamber, each of said elastic seats opening into said mixing chamber in a plane at right angles to a line joining the center of the socket with the center of the associated valve when the latter is closed against its seat.

3. A tap as claimed in claim 1 wherein each seat has an axial bore which is coaxial with the line joining the center of the socket and the center of the associated valve when the latter is closed against its seat.